US010261269B2

(12) United States Patent
Moriyama et al.

(10) Patent No.: US 10,261,269 B2
(45) Date of Patent: Apr. 16, 2019

(54) OPTICAL MODULE

(71) Applicant: FUJITSU COMPONENT LIMITED, Tokyo (JP)

(72) Inventors: Satoshi Moriyama, Tokyo (JP); Osamu Daikuhara, Tokyo (JP)

(73) Assignee: FUJITSU COMPONENT LIMITED, Tokyo (JP)

(*) Notice: Subject to any disclaimer, the term of this patent is extended or adjusted under 35 U.S.C. 154(b) by 0 days.

(21) Appl. No.: 15/843,488

(22) Filed: Dec. 15, 2017

(65) Prior Publication Data

US 2018/0252874 A1 Sep. 6, 2018

(30) Foreign Application Priority Data

Mar. 3, 2017 (JP) .................. 2017-040743

(51) Int. Cl.
| | |
|---|---|
| G02B 6/38 | (2006.01) |
| G02B 6/44 | (2006.01) |
| G02F 1/225 | (2006.01) |
| G02B 6/42 | (2006.01) |

(52) U.S. Cl.
CPC .......... G02B 6/3887 (2013.01); G02B 6/4477 (2013.01); G02B 6/4478 (2013.01); G02B 6/389 (2013.01); G02B 6/3846 (2013.01); G02B 6/3897 (2013.01); G02B 6/421 (2013.01); G02B 6/4281 (2013.01); G02B 6/4446 (2013.01); G02F 1/225 (2013.01)

(58) Field of Classification Search
CPC .. G02B 6/3887; G02B 6/4471; G02B 6/4477; G02B 6/4478

USPC ................ 385/88, 89, 92, 136, 137
See application file for complete search history.

(56) References Cited

U.S. PATENT DOCUMENTS

| | | | |
|---|---|---|---|
| 5,329,603 A | 7/1994 | Watanabe et al. | |
| 7,479,027 B1* | 1/2009 | Miller ................. | H01R 13/506 439/461 |
| 8,480,314 B2 | 7/2013 | Saito et al. | |
| 9,810,856 B2* | 11/2017 | Graham ............... | G02B 6/3887 |
| 9,900,101 B2* | 2/2018 | Leigh .................... | H04B 10/40 |
| 2002/0154872 A1* | 10/2002 | Miyokawa ........... | G02B 6/4201 385/92 |
| 2005/0041926 A1* | 2/2005 | Elkins, II ............. | G02B 6/3887 385/53 |
| 2007/0206914 A1* | 9/2007 | Tapper ................... | H02G 3/083 385/147 |
| 2010/0075535 A1* | 3/2010 | Mizutani ............. | H01R 13/504 439/588 |

(Continued)

FOREIGN PATENT DOCUMENTS

| | | |
|---|---|---|
| JP | H05-297246 | 11/1993 |
| JP | 2009-300799 | 12/2009 |

(Continued)

*Primary Examiner* — Robert Tavlykaev
(74) *Attorney, Agent, or Firm* — IPUSA, PLLC

(57) ABSTRACT

An optical module includes an optical waveguide configured to propagate light, an optical connector connected to the optical waveguide, an optical cable connected to the optical connector, a housing accommodating the optical waveguide and the optical connector, a cable clamp cover connected to the housing and covering the optical cable, and a cable boot connected to the cable clamp cover. The material of the cable clamp cover is harder than the material of the cable boot.

5 Claims, 17 Drawing Sheets

(56) References Cited

U.S. PATENT DOCUMENTS

2011/0130035 A1\* 6/2011 Ebihara .............. H01R 13/5205
439/587
2015/0331208 A1\* 11/2015 Moriyama .......... H01L 31/0232
385/14

FOREIGN PATENT DOCUMENTS

JP 2010-061011 3/2010
WO WO 2016/139304 A1 \* 9/2016 ............. H01R 13/52

\* cited by examiner

OPTICAL MODULE

CROSS-REFERENCE TO RELATED APPLICATION

The present application is based upon and claims priority to Japanese Patent Application No. 2017-040743, filed on Mar. 3, 2017, the entire contents of which are incorporated herein by reference.

BACKGROUND OF THE INVENTION

1. Field of the Invention

The present invention relates to optical modules.

2. Description of the Related Art

As communications at high-speed interfaces of supercomputers and high-end servers, for which wire cables have been used, optical communications, which can increase a signal transmission rate and extend a transmission distance, are becoming popular.

Next-generation interfaces whose transmission distance is as long as several dozen meters employ optical communications and use an optical module that connects an optical cable and a server or the like to convert an electrical signal and an optical signal to each other. The optical module converts an optical signal from the optical cable into an electrical signal, and outputs the electrical signal to the server. Furthermore, the optical module converts an electrical signal from the server into an optical signal, and outputs the optical signal to the optical cable.

The optical module includes a light-emitting device, a light-receiving device, a driver integrated circuit (IC) configured to drive the light-emitting device, and a transimpedance amplifier (TIA) configured to convert electric current into voltage. The light-emitting device, the light-receiving device, the driver IC, and the TIA are mounted on a circuit board, and the light-emitting device and the light-receiving device are connected to a ferrule by an optical waveguide. Reference may be made to Japanese Laid-open Patent Publication Nos. 5-297246, 2009-300799, and 2010-61011 for related art.

SUMMARY OF THE INVENTION

According to an aspect of the present invention, an optical module includes an optical waveguide configured to propagate light, an optical connector connected to the optical waveguide, an optical cable connected to the optical connector, a housing accommodating the optical waveguide and the optical connector, a cable clamp cover connected to the housing and covering the optical cable, and a cable boot connected to the cable clamp cover. The material of the cable clamp cover is harder than the material of the cable boot.

DESCRIPTION OF THE EMBODIMENTS

Figure 1:
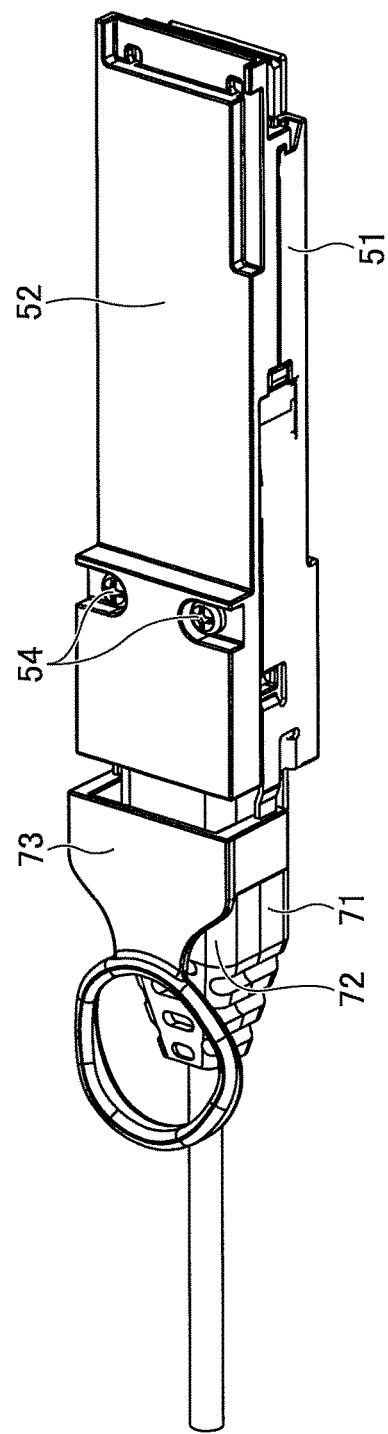
FIG. 1 is a perspective view of an optical module.

According to the optical module as described above, a cable boot is provided at the connection of the optical module and the optical cable to protect the optical cable. The cable boot is formed of a relatively soft material to accommodate the curving or bending of the optical cable. Therefore, the cable boot may move inside the optical module to prevent the optical cable from being fixed. Furthermore, part of the optical cable covered with the cable boot may bend significantly to cause optical loss to degrade characteristics or to excessively bend an optical fiber to prevent optically communicating information.

Therefore, there is a demand for an optical module that prevents significant bending of an optical cable to be less likely to cause optical loss, and to prevent the overbending or kinking of an optical fiber.

An optical module according to an embodiment of the present invention can prevent significant bending of an optical cable, and therefore, is less likely to cause optical loss and can prevent the overbending or kinking of an optical fiber.

Embodiments of the present invention are described below with reference to the accompanying drawings. The same elements or members are referred to using the same reference numeral, and are not repetitively described.

Figure 2:
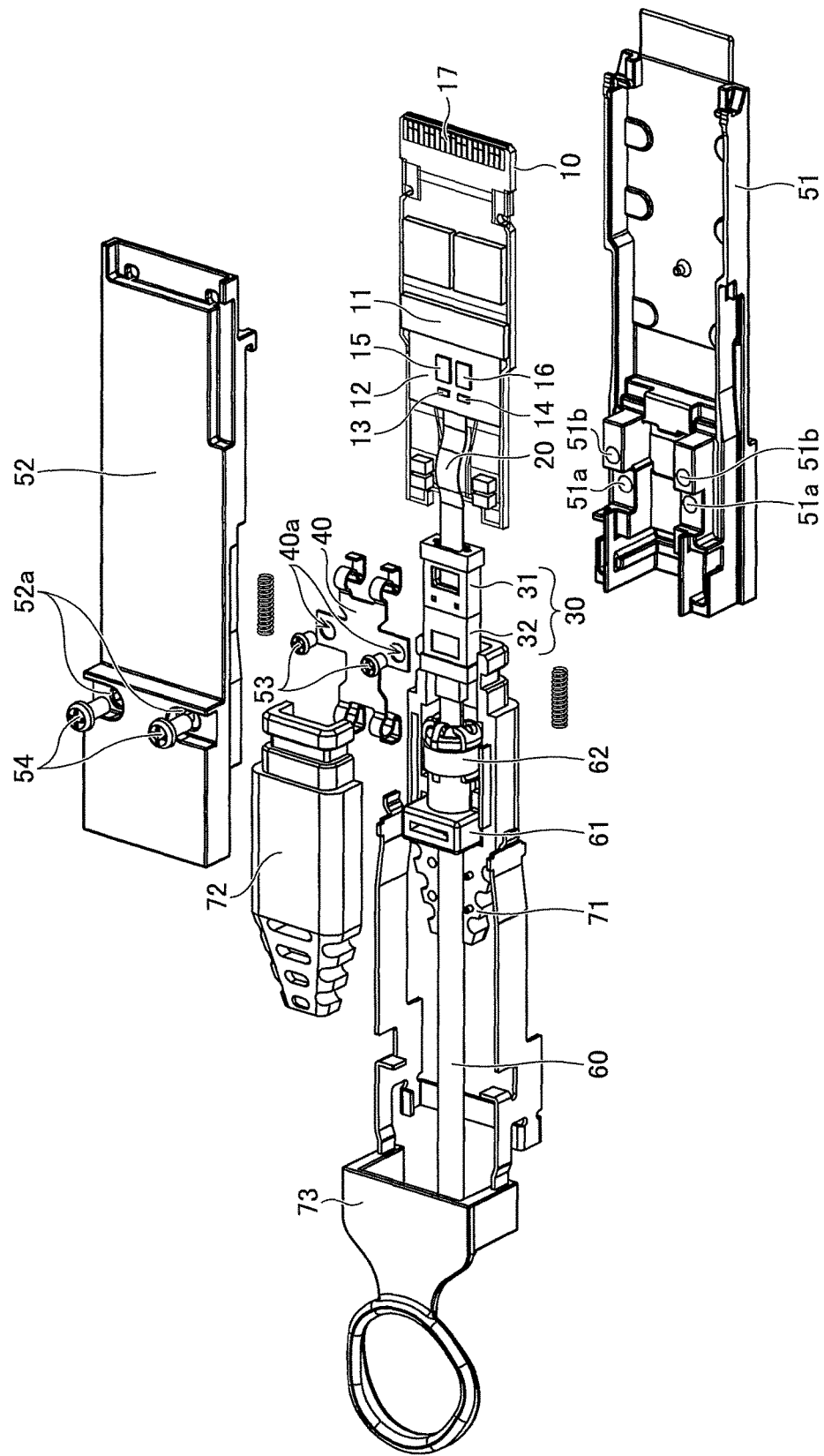
FIG. 2 is an exploded perspective view of the optical module.

An optical module is described with reference to FIGS. 1 and 2. FIGS. 1 and 2 are a perspective view and an exploded perspective view, respectively, of an optical module.

The optical module depicted in FIGS. 1 and 2 includes a circuit board ("board") 10, an optical waveguide 20, an optical connector 30, a clip 40, and a housing including a lower casing 51 and an upper casing 52. The board 10, the optical waveguide 20, the optical connector 30, and the clip 40 are accommodated in the housing. An optical cable 60 is connected to the optical module. Part of the optical cable 60 is covered with the housing.

A flexible printed circuit (FPC) connector 11 to which an FPC 12 is connected is provided on the board 10. A light-emitting device 13 configured to convert an electrical signal into an optical signal to emit the optical signal, such as a vertical cavity surface emitting laser (VCSEL), a light-receiving device 14 configured to convert an optical signal into an electrical signal, such as a photodiode, a driver IC 15 configured to drive the light-emitting device 13, and a TIA 16 configured to convert the output electric current of the light-receiving device 14 into voltage are mounted on the FPC 12. Furthermore, terminals 17 for external connection are provided on the board 10. The light-emitting device 13 and the light-receiving device 14 are also referred to as "photoelectric conversion devices".

The optical waveguide 20 is in the form of a flexible sheet. The optical waveguide 20 includes multiple cores and cladding surrounding the cores. Light entering the optical waveguide 20 propagates through the cores.

The optical connector 30 includes a ferrule with lenses ("lens ferrule") 31 and a mechanically transferable (MT) ferrule 32, which are connected to be held and fixed by the clip 40.

The optical waveguide 20 is connected to the lens ferrule 31. Screw holes 40a are formed in the clip 40. Screw holes 51a are formed in the lower casing 51. The clip 40 is screwed to the lower casing 51 with screws 53 inserted through the screw holes 40a and the screw holes 51a that are aligned with each other. By screwing the clip 40, the optical connector 30 is fixed to the lower casing 51.

A sleeve 61 is fixed around the optical cable 60 by a crimp ring 62. Cable boots 71 and 72 are placed over the optical cable 60 to which the sleeve 61 is fixed from below and above the optical cable 60, and a pull tab and latch 73 is attached to the housing.

The upper casing 52 is placed over the lower casing 51, and the upper casing 52 and the lower casing 51 are screwed together with screws 54 inserted through screw holes 52a of the upper casing 52 and screw holes 51b of the lower casing 51. The lower casing 51 and the upper casing 52 are thus fixed. The lower casing 51 and the upper casing 52 are formed of a metal material.

Figure 3:
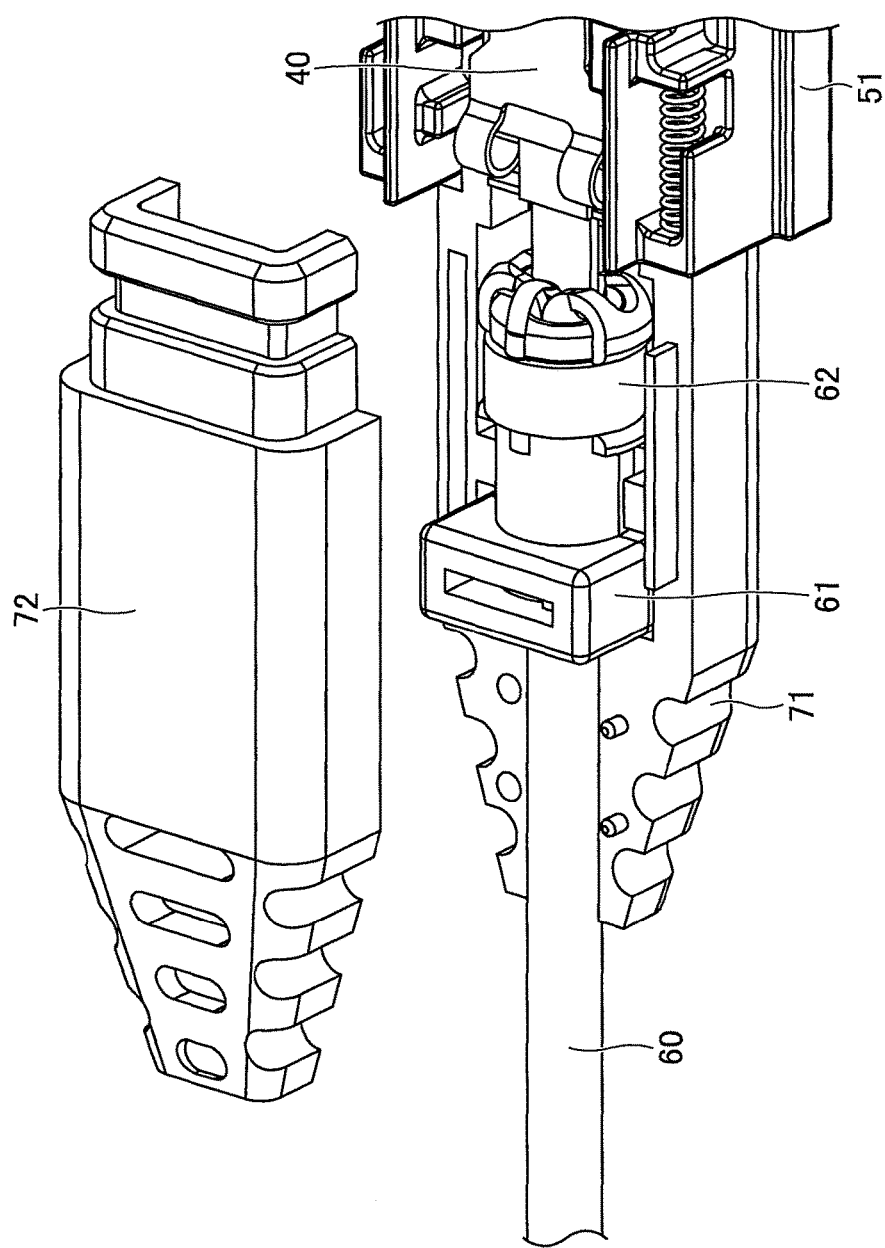
FIG. 3 is an exploded perspective view of part of the optical module.

FIG. 3 is an exploded perspective view of part of the optical module. Referring to FIG. 3, part of the optical cable 60 connected to the optical module is held between the cable boots 71 and 72. The cable boots 71 and 72 are formed of an elastically deformable soft resin material such as a thermoplastic elastomer (TPE) to accommodate the curving or bending of the optical cable 60. The cable boots 71 and 72 are bonded together by an adhesive to be fixed, with the optical cable 60 held between the cable boots 71 and 72.

Figure 4:
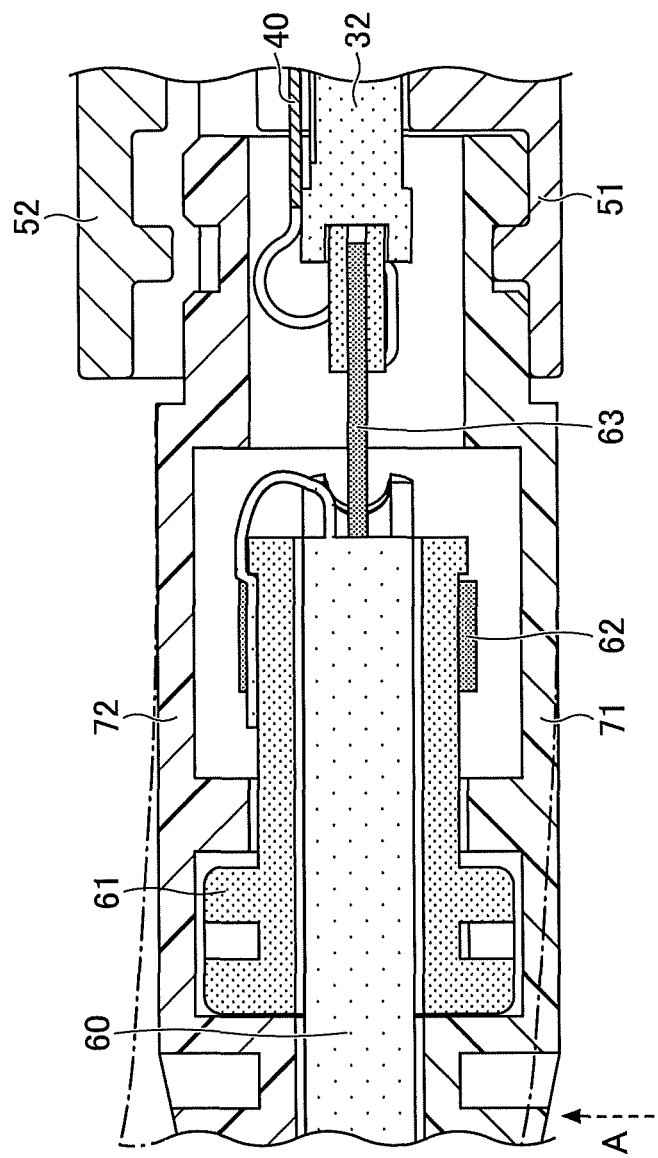
FIG. 4 is a diagram illustrating the optical module in which an optical cable is bent.

FIG. 4 is a cross-sectional view of the optical module to which the optical cable 60 is attached. The cable boots 71 and 72 are formed of a soft resin material. Therefore, as illustrated in FIG. 4, when a force is applied to the cable boots 71 and 72 in a direction indicated by the dashed arrow A, the cable boots 71 and 72 deform as indicated by a one-dot chain line. As the cable boots 71 and 72 deform, the optical cable 60 deforms to bend an optical fiber 63 in the optical cable 60. When the optical fiber 63 bends at or below a predetermined bend radius, optical loss occurs or the optical fiber 63 excessively bends or kinks. Furthermore, because of the movement of the cable boots 71 and 72, the position of the sleeve 61 fixing the optical cable 60 cannot be fixed.

In addition, the cable boots 71 and 72 are bonded using an adhesive such as a cyanoacrylate adhesive, and such an adhesive takes 8 hours to 24 hours to completely bond the cable boots 71 and 72. Therefore, it takes time to manufacture the optical module, thus causing an increase in cost.

Instead of bonding the cable boots 71 and 72, it is possible to screw the cable boots 71 and 72 or fix the optical cable 60 to the housing by crimping or swaging. Neither process, however, is preferable because of an increase in the number of assembling steps and in light of attachment accuracy.

Therefore, there is a demand for an optical module that prevents significant bending of an optical cable to be less likely to cause optical loss, and to prevent the overbending or kinking of an optical fiber, and that can be manufactured in a short time.

First Embodiment

Next, an optical module according to a first embodiment is described with reference to FIGS. 5 through 10.

Figure 5:
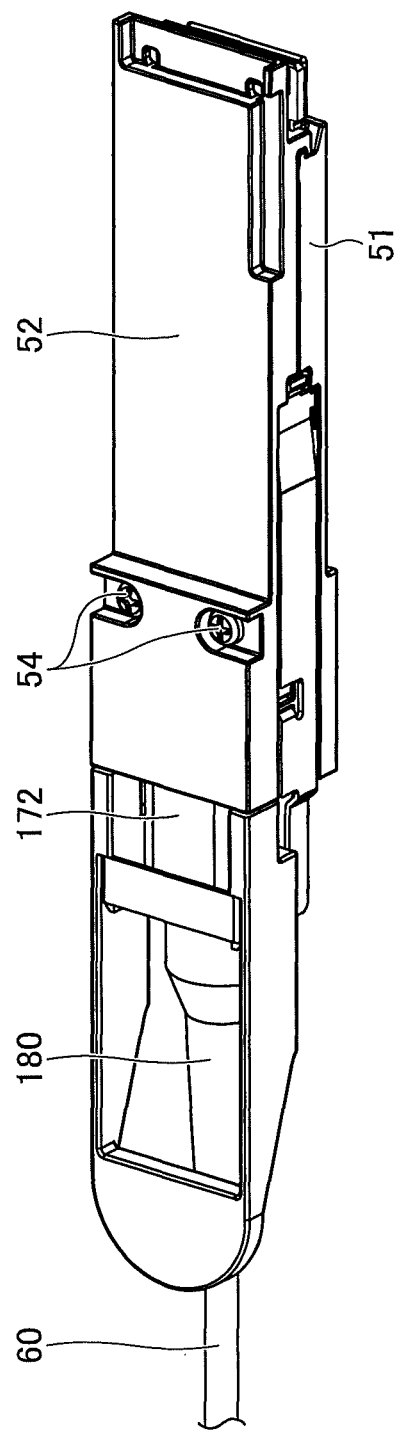
FIG. 5 is a perspective view of an optical module according to a first embodiment.
Figure 6:
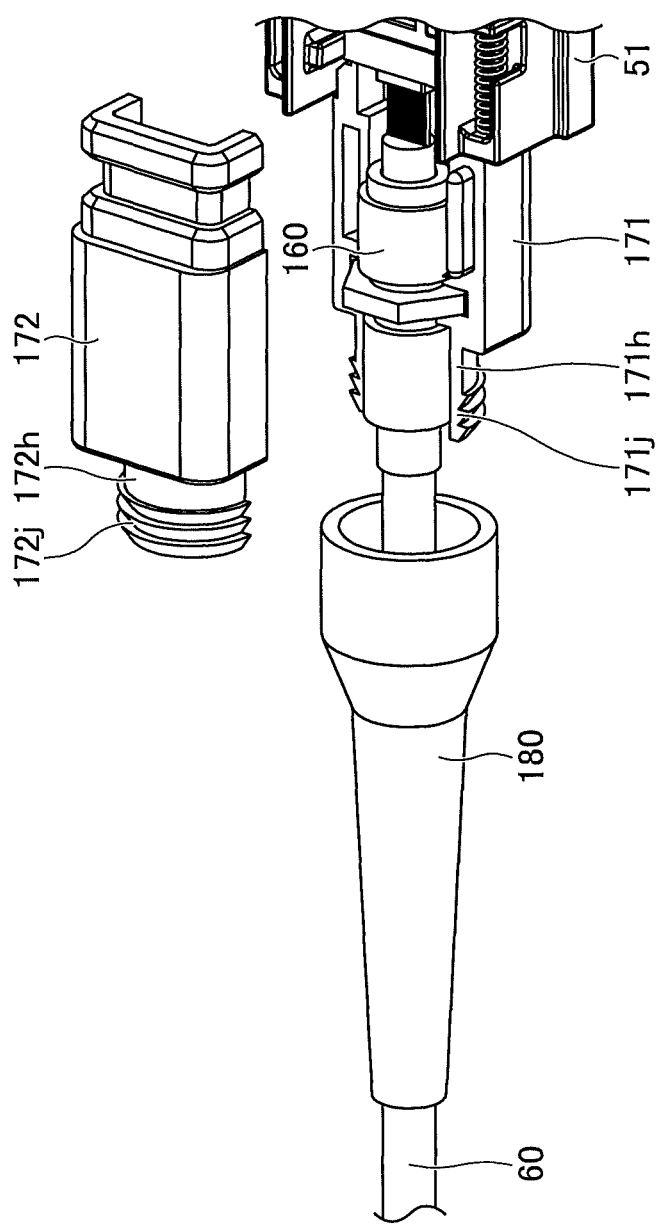
FIG. 6 is an exploded perspective view of part of the optical module according to the first embodiment.
Figure 7:
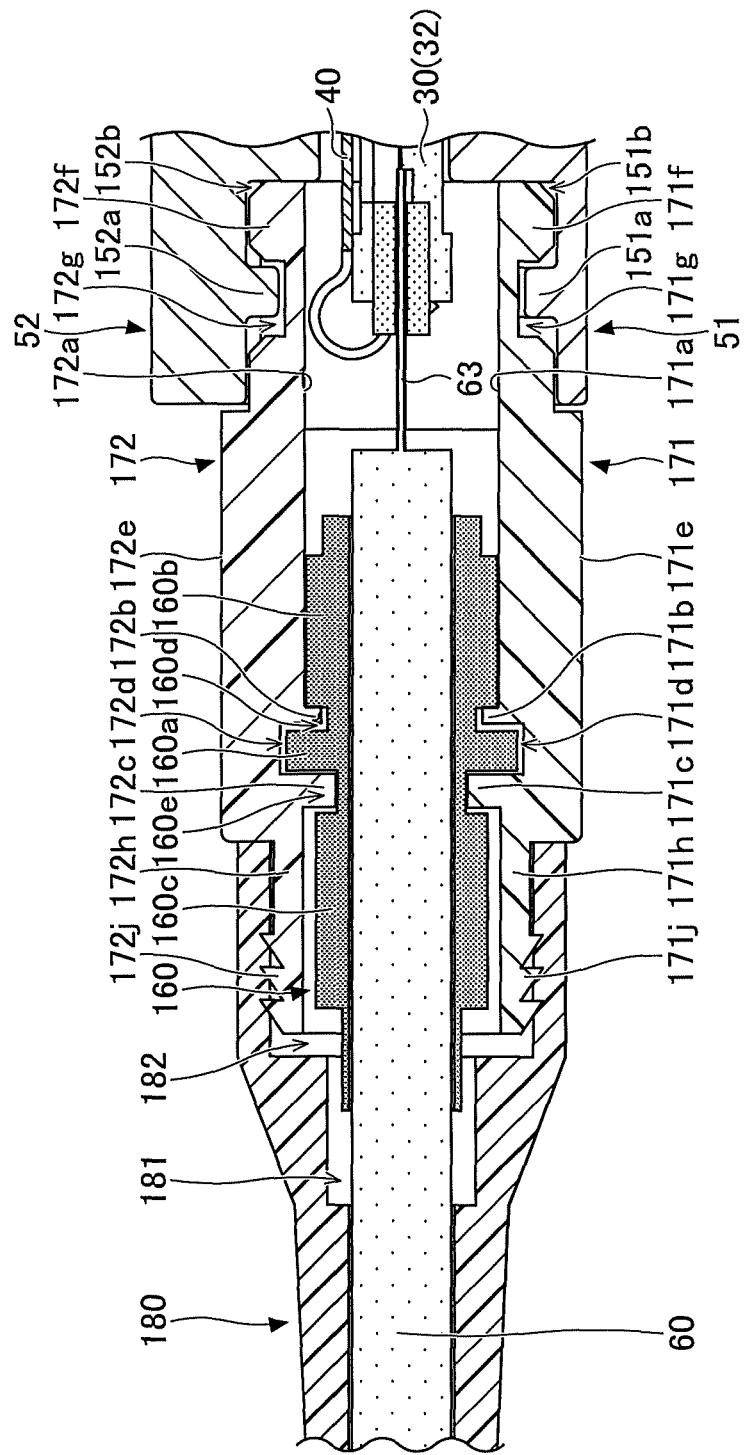
FIG. 7 is a cross-sectional view of part of the optical module according to the first embodiment.

FIG. 5 is a perspective view of the optical module. FIG. 6 is an exploded perspective view of part of the optical module. FIG. 7 is a cross-sectional view of part of the optical module. Referring to FIGS. 5 through 7, the optical module according to this embodiment includes a pair of cable clamp covers 171 and 172 and a single cable boot 180. The cable clamp covers 171 and 172, which are separate parts, are attached together to hold the optical cable 60 from below and above the optical cable 60. A tightening member 160 is attached around part of the optical cable 60 held between the cable clamp covers 171 and 172.

Figure 8:
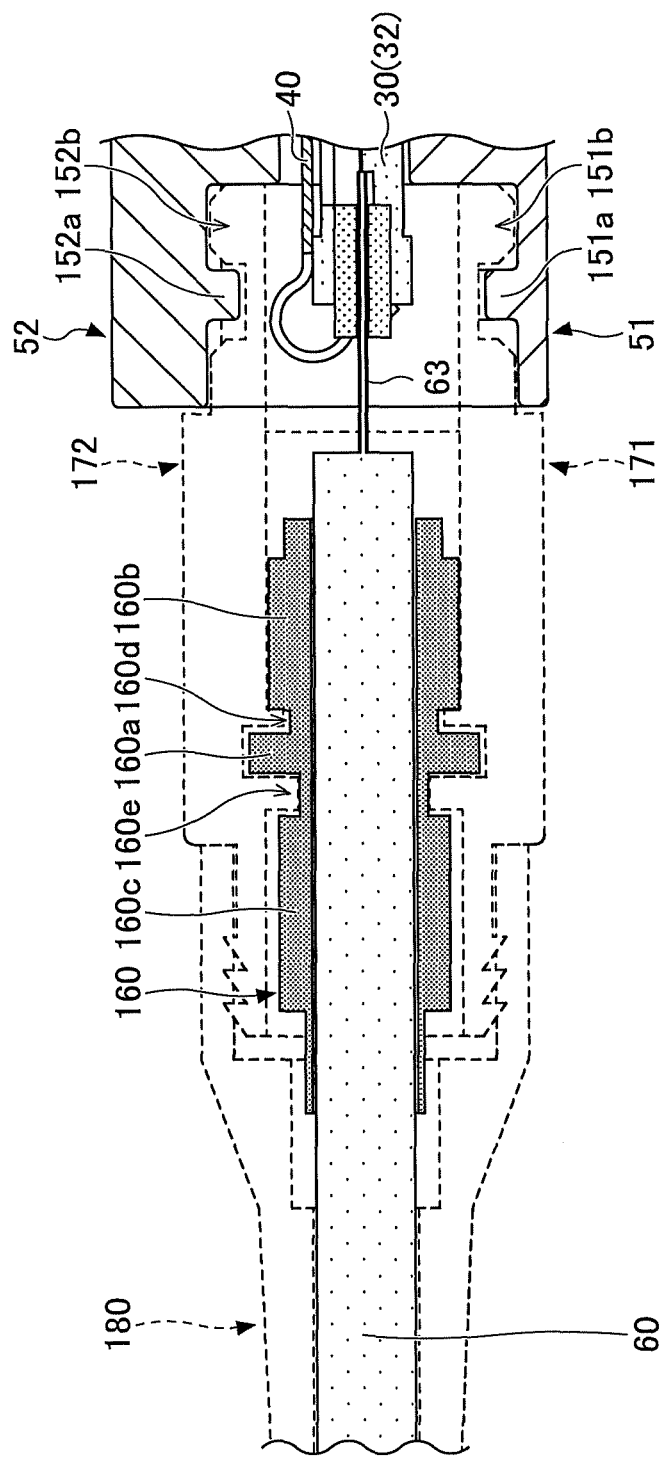
FIG. 8 is a diagram illustrating the optical module according to the first embodiment.

FIG. 8 is a cross-sectional view of the optical module, where part of the optical module other than the optical cable 60, the tightening member 160, the lower casing 51, and the upper casing 52 is indicated by a dashed line. Referring to FIG. 8, the tightening member 160 is attached around a predetermined area of the periphery of the optical cable 60.

The tightening member 160 includes a central protrusion 160a formed around its periphery to protrude outward. The tightening member 160 further includes a protrusion 160b formed on the optical connector 30 side, namely, the right side in FIG. 8, of the protrusion 160a to be positioned between the protrusion 160a and the optical connector 30. Furthermore, the tightening member 160 includes a protrusion 160c formed on the opposite side of the protrusion 160a from the protrusion 160b (that is, on the left side of the protrusion 160a in FIG. 8). As a result, a depression 160d is formed between the protrusions 160a and 160b and a depression 160e is formed between the protrusions 160a and 160c in the tightening member 160.

The lower casing 51 includes an inward protrusion 151a formed near the end of the lower casing 51 on the cable connection side, namely, the side on which the optical cable 60 connects to the optical module (the left side in FIG. 8), on the inside surface of the lower casing 51. A depression 151b is formed on the bottom side of the protrusion 151a, namely, on the right side of the protrusion 151a in FIG. 8. Likewise, the upper casing 52 includes an inward protrusion 152a formed near the end of the upper casing 52 on the cable connection side on the inside surface of the upper casing 52. A depression 152b is formed on the bottom side of the protrusion 152a, namely, on the right side of the protrusion 152a in FIG. 8. The protrusions 151a and 152a face each other and the depressions 151b and 152b face each other with the lower casing 51 and the upper casing 52 fixed together.

Figure 9:
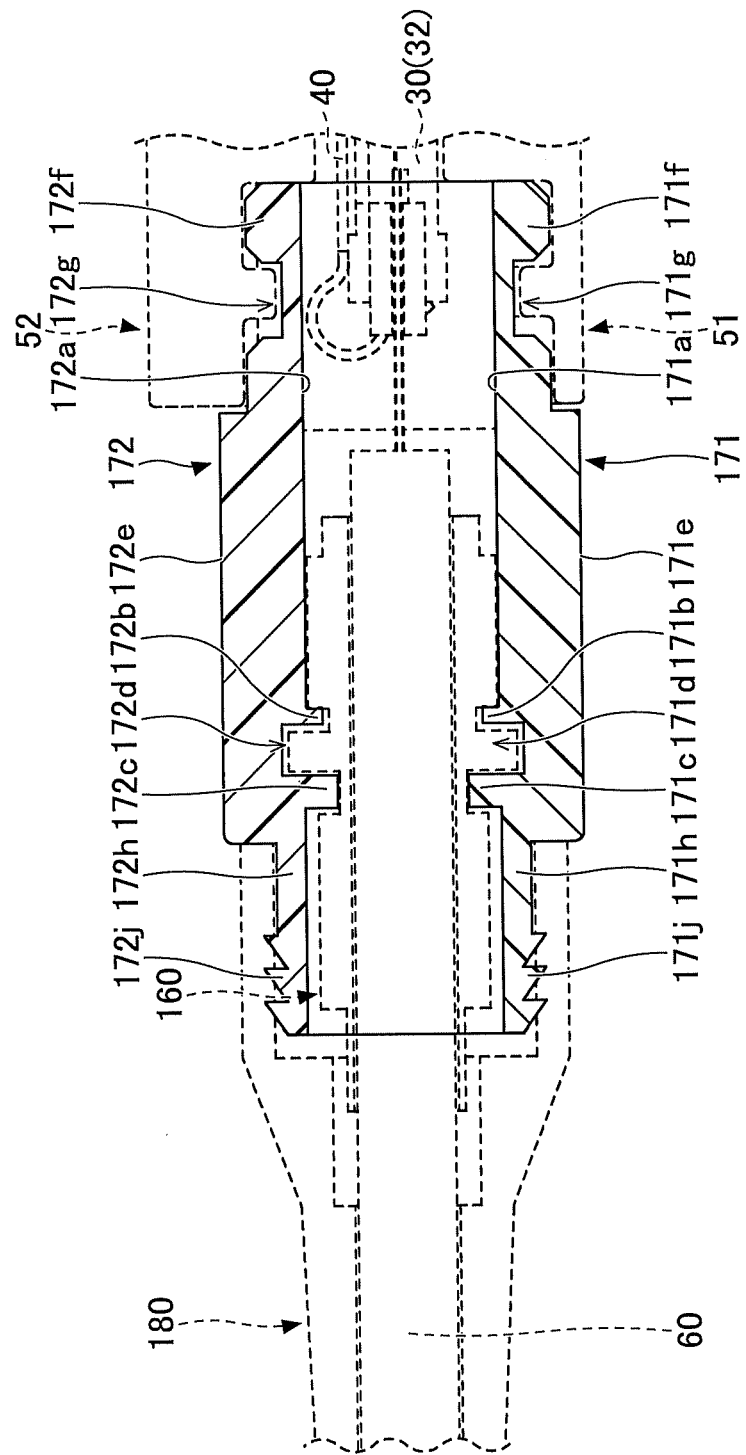
FIG. 9 is a diagram illustrating the optical module according to the first embodiment.

Next, the cable clamp covers 171 and 172 are described with reference to FIG. 9. FIG. 9 is a cross-sectional view of the optical module, where part of the optical module other than the cable clamp covers 171 and 172 is indicated by a dashed line. The cable clamp cover 171 includes a protrusion 171b formed on an inside surface 171a of the cable clamp cover 171. Furthermore, the cable clamp cover 171 includes a protrusion 171c formed on the opposite side of the protrusion 171b from the optical connector 30, namely, on the left side of the protrusion 171b in FIG. 9, on the inside surface 171a. A depression 171d is formed between the protrusions 171b and 171c. The cable clamp cover 171 further includes a protrusion 171f formed at its connector-side end, namely, the end of the cable clamp cover 171 on the optical connector 30 side (that is, the right end of the cable clamp cover 171 in FIG. 9), on an outside surface 171e of the cable clamp cover 171. A depression 171g is formed on the left side of the protrusion 171f in FIG. 9, next to the protrusion 171f in a direction away from the connector-side end of the cable clamp cover 171. Furthermore, the outside surface 171e of the cable clamp cover 171 is depressed over a region extending from its boot-side end, namely, the end of the cable clamp cover 171 on the side opposite to the optical connector 30 side (that is, the left-side end of the cable clamp cover 171 in FIG. 9), to form a connection region 171h. The outside surface 171e includes multiple projections 171j in the connection region 171h.

Likewise, the cable clamp cover 172 includes a protrusion 172b formed on an inside surface 172a of the cable clamp cover 172. Furthermore, the cable clamp cover 172 includes a protrusion 172c formed on the opposite side of the protrusion 172b from the optical connector 30, namely, on the left side of the protrusion 172b in FIG. 9, on the inside surface 172a. A depression 172d is formed between the protrusions 172b and 172c. The cable clamp cover 172 further includes a protrusion 172f formed at its connector-side end, namely, the end of the cable clamp cover 172 on the optical connector 30 side (that is, the right end of the cable clamp cover 172 in FIG. 9), on an outside surface 172e of the cable clamp cover 172. A depression 172g is formed on the left side of the protrusion 172f, next to the protrusion 172f in a direction away from the connector-side end of the cable clamp cover 172. Furthermore, the outside surface 172e of the cable clamp cover 172 is depressed over a region extending from its boot-side end, namely, the end of the cable clamp cover 172 on the side opposite to the optical connector 30 side (that is, the left-side end of the cable clamp cover 172 in FIG. 9), to form a connection region 172h. The outside surface 172e includes multiple projections 172j in the connection region 172h.

With the cable clamp covers 171 and 172 attached together, the protrusions 171b and 172b face each other, the protrusions 171c and 172c face each other, and the depressions 171d and 172d face each other.

Figure 10:
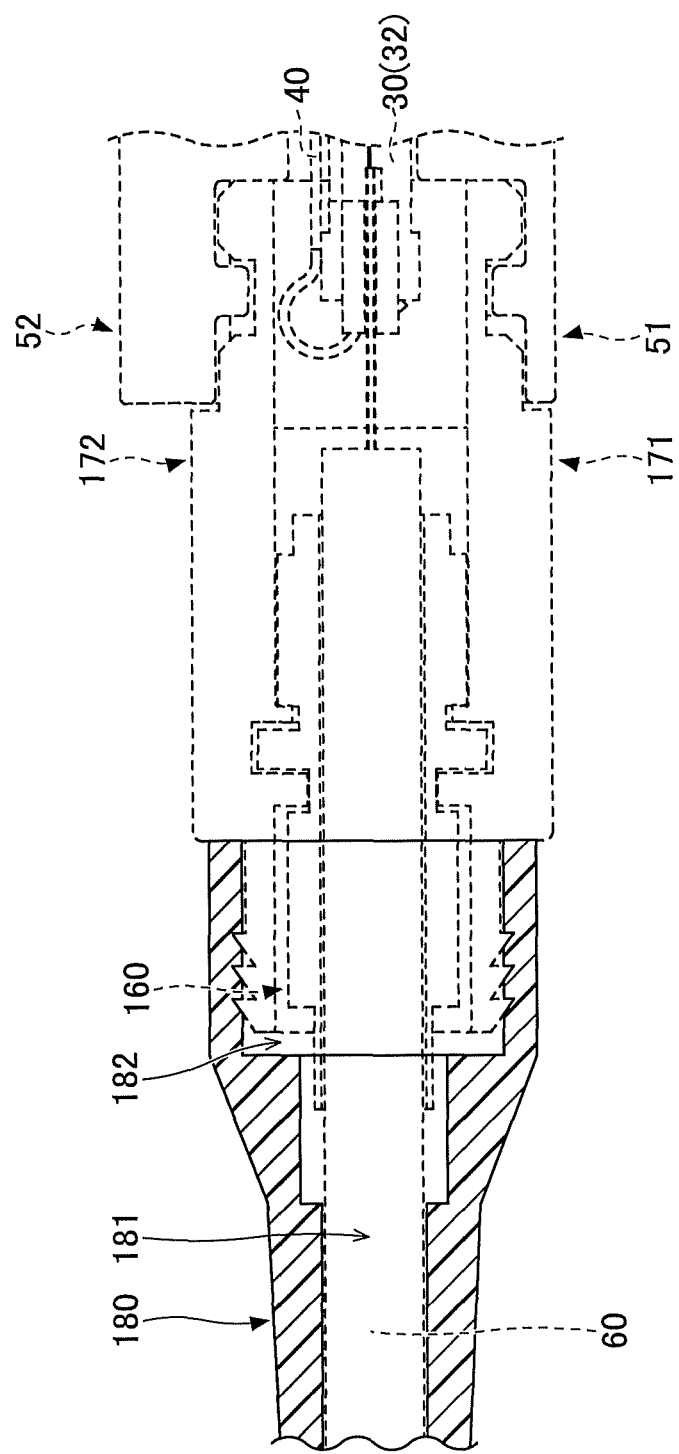
FIG. 10 is a diagram illustrating the optical module according to the first embodiment.

Next, the cable boot 180 is described with reference to FIG. 10. FIG. 10 is a cross-sectional view of the optical module, where part of the optical module other than the cable boot 180 is indicated by a dashed line. The cable boot 180 includes an opening 181 for inserting the optical cable 60, and has a tubular shape. The cable boot 180 further includes an opening 182 on the optical connector 30 side, namely, on the right side in FIG. 10, of the opening 181. The opening 182 is wider than the opening 181. That is, the inside surface of the cable boot 180 is stepped to increase the inside diameter of the cable boot 180 toward the optical connector 30. Furthermore, in part of the cable boot 180 extending from the end of the cable boot 180 facing away from the optical connector 30, namely, the left end of the cable boot 180 in FIG. 10, the outside diameter of the cable boot 180 and the thickness of the cable boot 180 are gradually reduced toward the left end of the cable boot 180.

Referring to FIGS. 6 through 10, according to the optical module of this embodiment, the cable clamp covers 171 and 172 are attached together to cover the tightening member 160 attached around the optical cable 60. In this state, the protrusion 160a of the tightening member 160 is in the depressions 171d and 172d. Furthermore, the protrusions 171b and 172b are in the depression 160d of the tightening member 160. In addition, the protrusions 171c and 172c are in the depression 160e of the tightening member 160.

According to this embodiment, the cable clamp covers 171 and 172 are attached with part of the cable clamp covers 171 and 172 held between the lower casing 51 and the upper casing 52. In this state, the protrusion 151a of the lower casing 51 is in the depression 171g of the cable clamp cover 171, and the protrusion 171f of the cable clamp cover 171 is in the depression 151b of the lower casing 51. Furthermore, the protrusion 152a of the upper casing 52 is in the depression 172g of the cable clamp cover 172, and the protrusion 172f of the cable clamp cover 172 is in the depression 152b of the upper casing 52.

Thus, the optical cable 60 is attached to the lower casing 51 and the upper casing 52 via the cable clamp covers 171 and 172 and the tightening member 160.

The cable boot 180 is attached to cover part of the cable clamp covers 171 and 172. Specifically, the cable boot 180 is attached to the cable clamp covers 171 and 172 to accommodate the connection region 171h of the cable clamp cover 171 and the connection region 172h of the cable clamp cover 172 in the opening 182. As a result, the outside surface 171e of the connection region 171h and the outside surface 172e of the connection region 172h are covered with the inside surface of the cable boot 180 around the opening 182. Accordingly, the cable clamp covers 171 and 172 are fixed with their end portions on the optical connector 30 side held between the lower casing 51 and the upper casing 52 and their end portions on the side opposite to the optical connector 30 side covered with the cable boot 180. According to this embodiment, because the cable clamp covers 171 and 172 are covered with the cable boot 180, it is possible to fix the cable clamp covers 171 and 172 without use of an adhesive.

According to this embodiment, the cable clamp covers 171 and 172 are formed of a relatively hard resin material such as polybutylene terephthalate (PBT) or a metal material, and the cable boot 180 is formed of a relatively soft resin material such as a thermoplastic elastomer. That is, according to the optical module of this embodiment, the material of the cable boot 180 is softer than the material of the cable clamp covers 171 and 172. The optical cable 60 is covered with the cable clamp covers 171 and 172, which are relatively hard and hardly deform, where the optical cable 60 connects to the lower casing 51 and the upper casing 52. Therefore, even when the optical cable 60 is bent, the optical cable 60 is prevented from bending significantly. Accordingly, the optical module is less likely to cause optical loss and can prevent the overbending or kinking of the optical fiber 63. Furthermore, a region of the optical cable 60 distant from the lower casing 51 and the upper casing 52 is covered with the cable boot 180, which is formed of a relatively soft material. Therefore, it is possible to prevent the movement of the optical cable 60 from being restricted relative to the optical module.

In particular, the cable boot 180 is formed to become thinner or taper toward its end facing away from the cable clamp covers 171 and 172. As the cable boot 180 becomes thinner, the movement of the optical cable 60 becomes less likely to be restricted. Therefore, the latitude of the movement of the optical cable 60 can increase as the distance from the optical module increases. Accordingly, even in the case of bending the optical cable 60 to connect the optical module to the optical cable 60, it is possible to connect the optical module to the optical cable 60 without significantly bending the optical cable 60 at its connection with the lower casing 51 and the upper casing 52.

Figure 11:
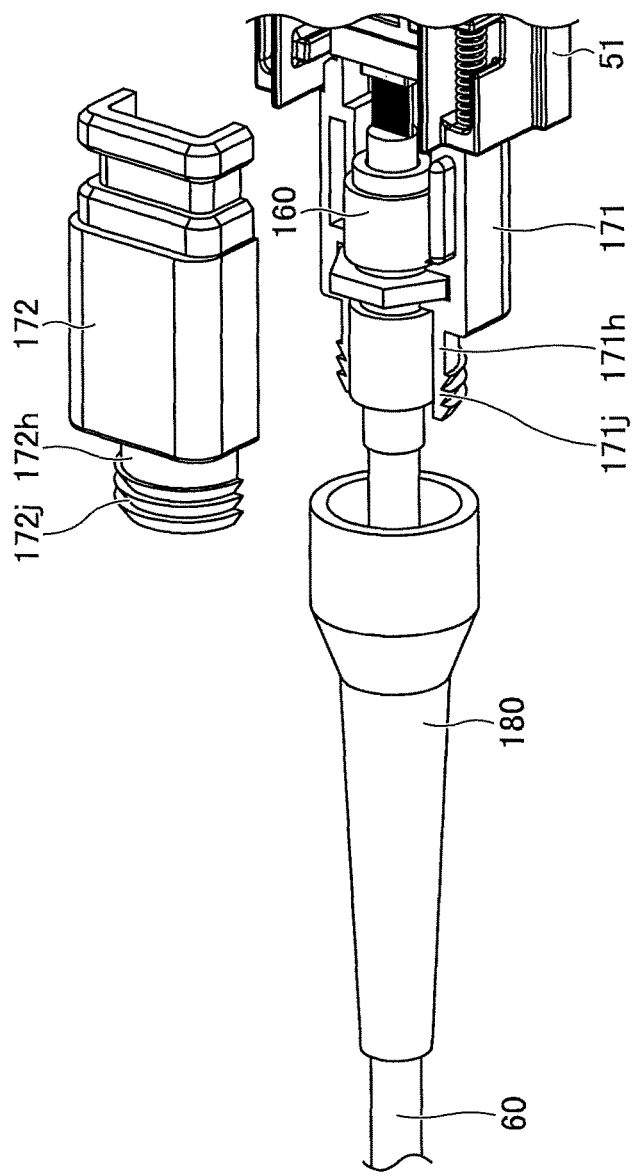
FIG. 11 is a diagram illustrating a process of assembling an optical module according to the first embodiment.
Figure 12:
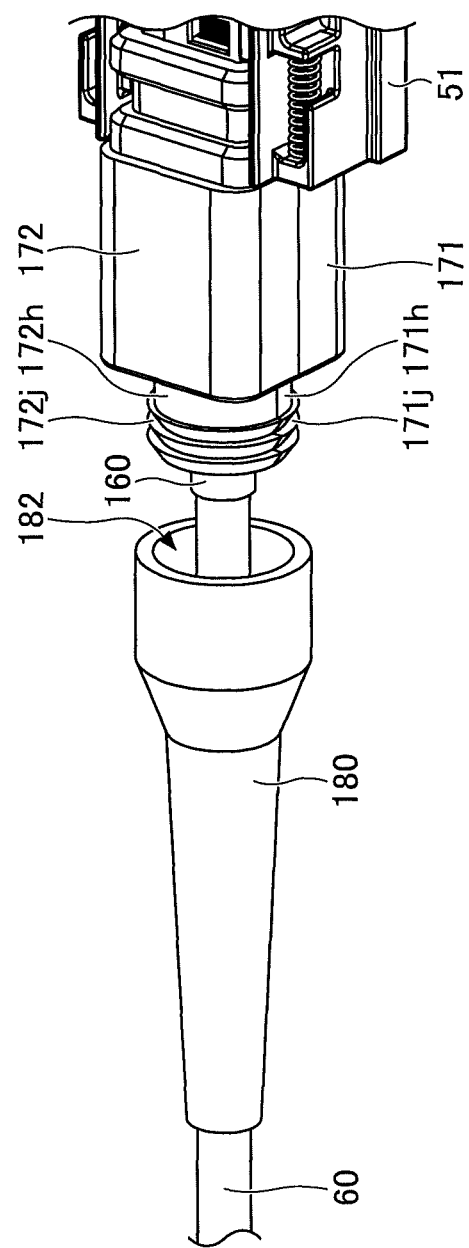
FIG. 12 is a diagram illustrating the process of assembling an optical module according to the first embodiment.
Figure 13:
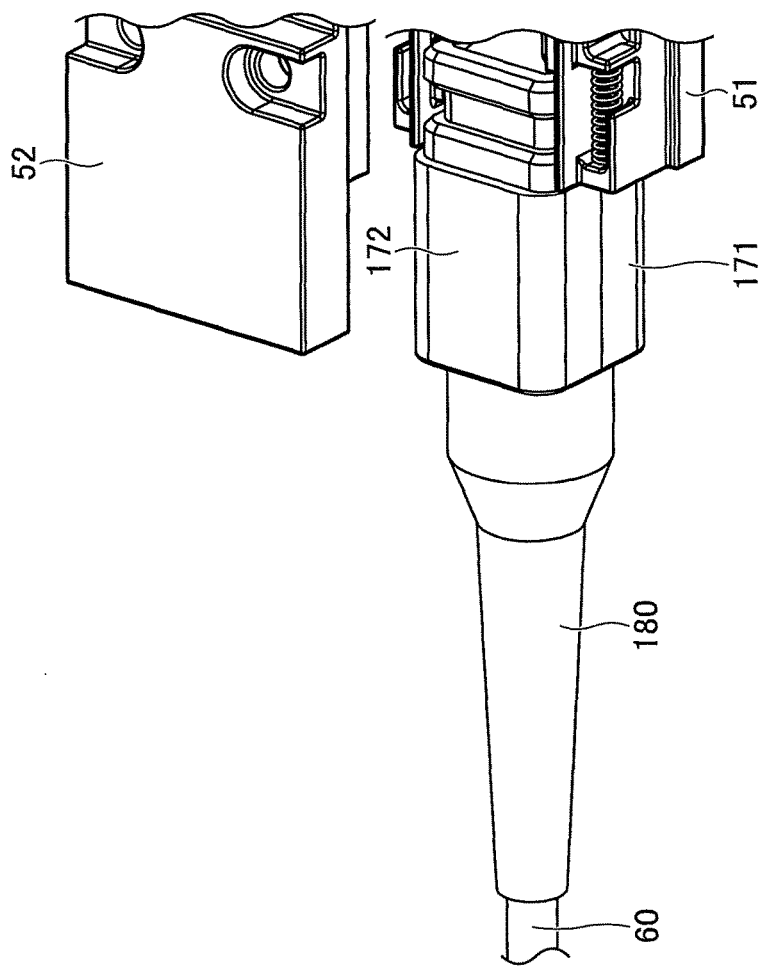
FIG. 13 is a diagram illustrating the process of assembling an optical module according to the first embodiment.

FIGS. 11 through 13 are diagrams illustrating a process of assembling an optical module according to this embodiment. In attaching the cable clamp covers 171 and 172 and the cable boot 180 to the lower casing 51 and the upper casing 52, first, as illustrated in FIG. 11, the cable clamp cover 171 is attached to the lower casing 51, part of the optical cable 60 on which the tightening member 160 is attached is placed inside the cable clamp cover 171, and the cable clamp cover 172 is placed over the cable clamp cover 171. As a result, as illustrated in FIG. 12, the tightening member 160 is held between the cable clamp cover 171 and the cable clamp cover 172. Next, in this state, the connection regions 171h and 172h are inserted into the opening 182 of the cable boot 180. Thereafter, as illustrated in FIG. 13, the upper casing 52 is placed over and fixed to the lower casing 51.

By the above-described process, the cable clamp covers 171 and 172 and the cable boot 180 can be attached to the lower casing 51 and the upper casing 52. Therefore, a bonding process using an adhesive is not necessary to attach the cable boot 180. Accordingly, the optical module can be manufactured in a short time at low cost.

At the connection of the optical cable 60 with the cable clamp covers 171 and 172, the protrusion 160a of the tightening member 160 is in the depressions 171d and 172d of the cable clamp covers 171 and 172, the protrusions 171b and 172b of the cable clamp covers 171 and 172 are in the depression 160d of the tightening member 160, and the protrusions 171c and 172c of the cable clamp covers 171 and 172 are in the depression 160e of the tightening member 160 to connect the optical cable 60 to the cable clamp covers 171 and 172. Therefore, the optical cable 60 is less likely to be removed from the optical module.

Furthermore, the surfaces (outside surfaces 171e and 172e) of the connection regions 171h and 172h of the cable clamp covers 171 and 172 covered with the cable boot 180 include the projections 171j and 172j. The projections 171j and 172j have a saw-toothed cross section to catch the inside surface of the cable boot 180 covering the connection regions 171h and 172h in the opening 182. Therefore, even when the optical cable 60 is pulled, the cable boot 180 is less likely to be removed from the cable clamp covers 171 and 172.

Figure 14:
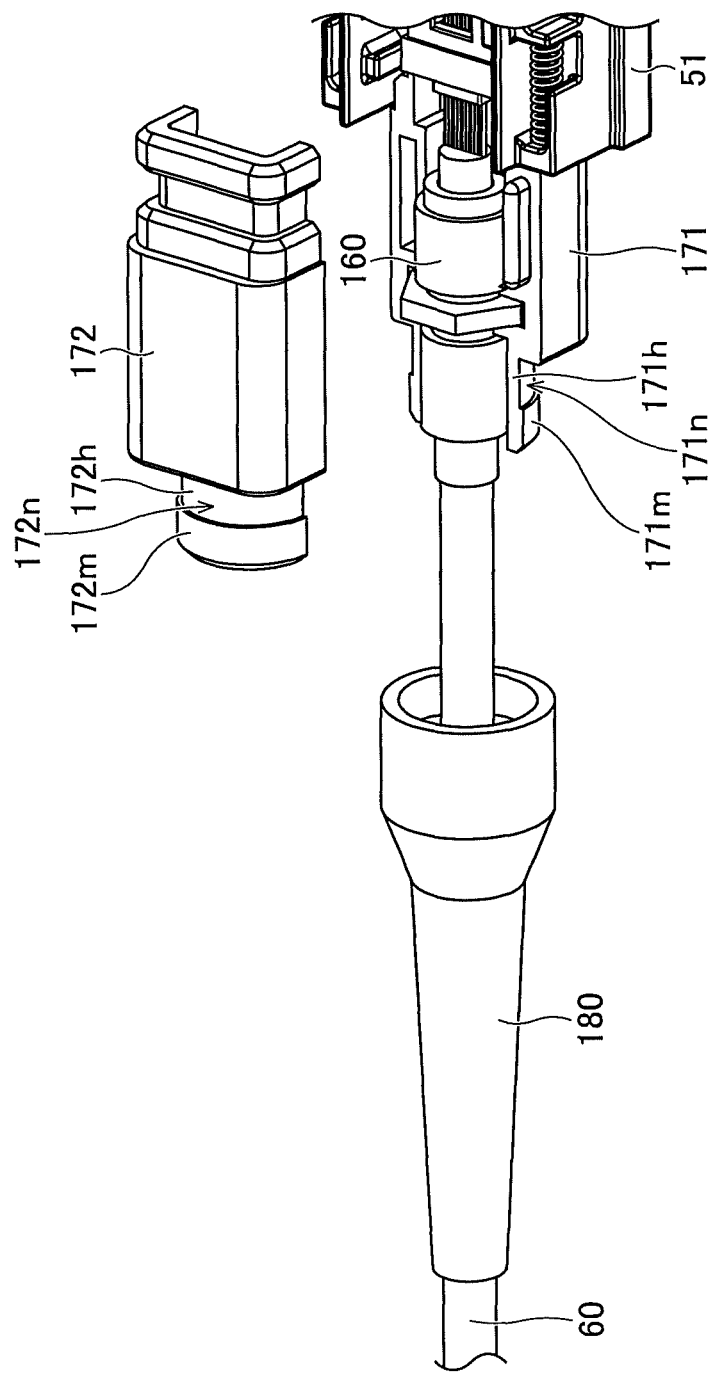
FIG. 14 is an exploded perspective view of part of the optical module according to a variation of the first embodiment.
Figure 15:
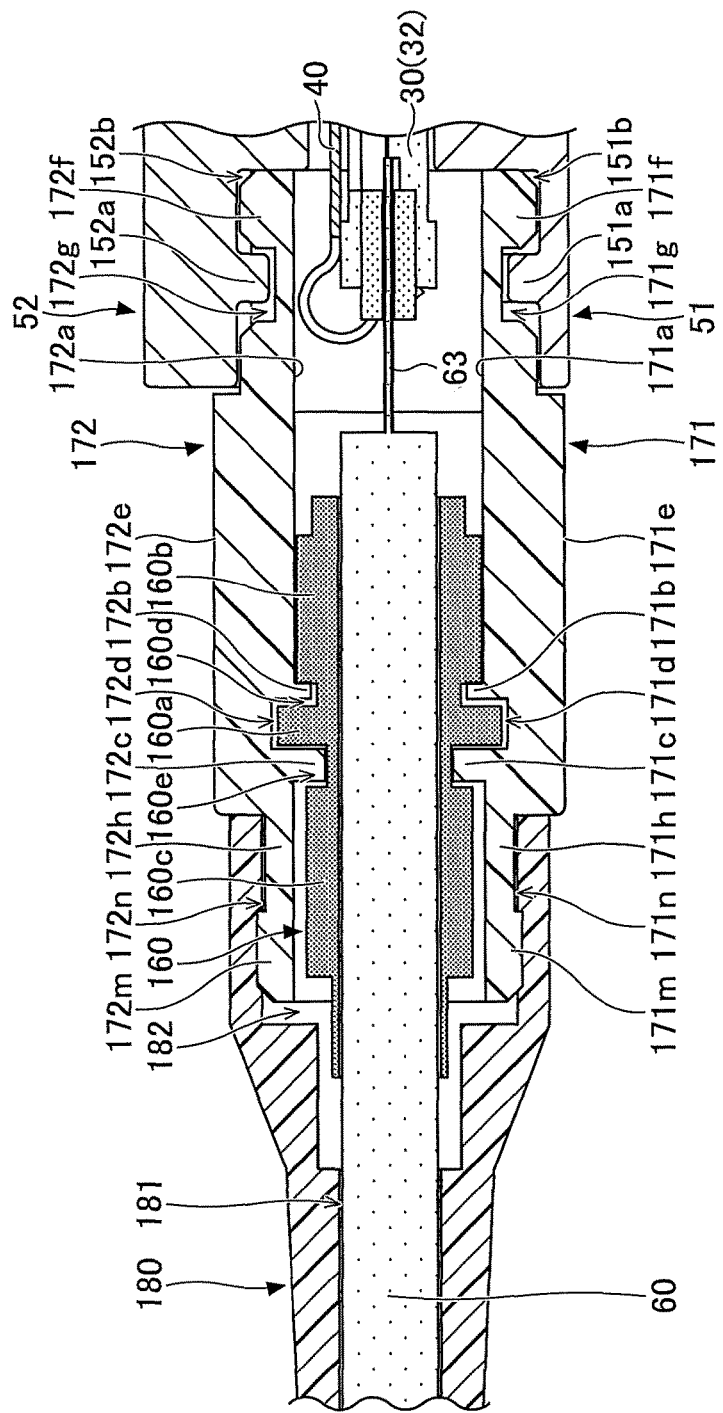
FIG. 15 is a cross-sectional view of part of the optical module according to the variation.

Next, a variation of the optical module according to this embodiment is described with reference to FIGS. 14 and 15. FIGS. 14 and 15 are an exploded perspective view and a cross-sectional view, respectively, of part of the optical module according to the variation. Referring to FIGS. 14 and 15, instead of the projections 171j, the connection region 171h of the cable clamp cover 171 may include a projection 171m at the boot-side end of the cable clamp cover 171 and a depression 171n on the optical connector 30 side of the projection 171m. Likewise, instead of the projections 172j, the connection region 172h of the cable clamp cover 172 may include a projection 172m at the boot-side end of the cable clamp cover 172 and a depression 172n on the optical connector 30 side of the projection 172m.

In this case as well, the projections 171m and 172m catch the inside surface of the cable boot 180 covering the connection regions 171h and 172h in the opening 182. Therefore, even when the optical cable 60 is pulled, the cable boot 180 is less likely to be removed from the cable clamp covers 171 and 172.

Second Embodiment

Figure 16:
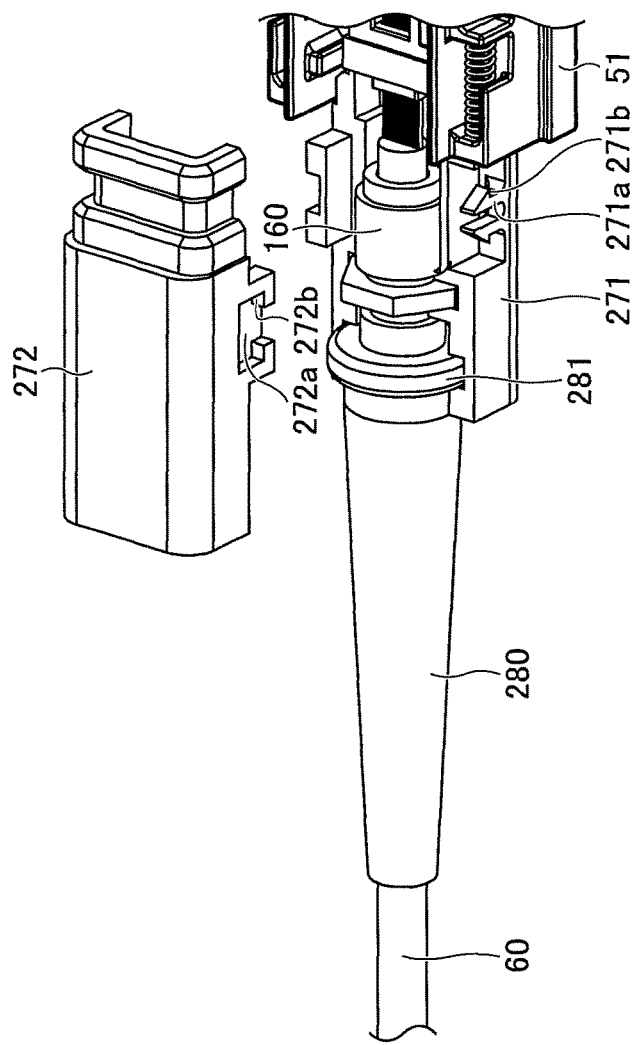
FIG. 16 is an exploded perspective view of part of an optical module according to a second embodiment.
Figure 17B:
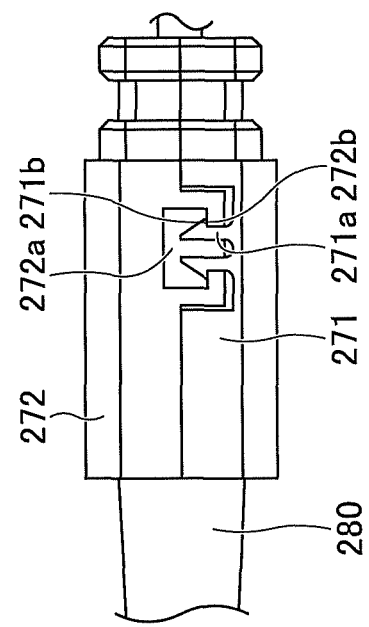
FIGS. 17A and 17B are side views of part of the optical module according to the second embodiment.
Figure 17A:
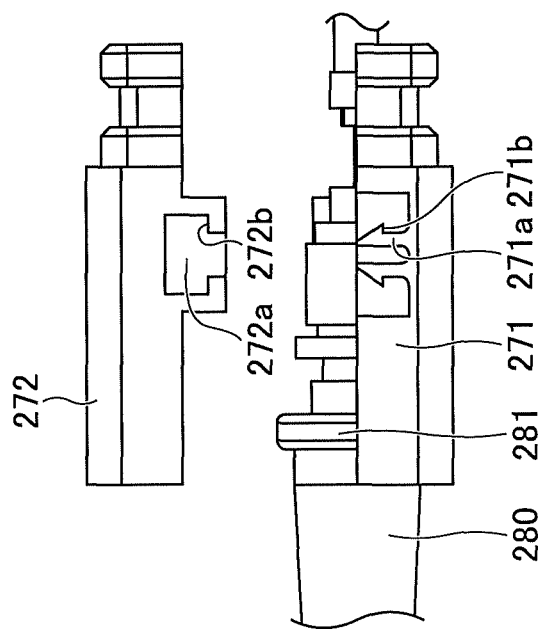

Next, a second embodiment is described with reference to FIGS. 16, 17A and 17B. FIG. 16 is an exploded perspective view of part of an optical module according to the second embodiment. FIGS. 17A and 17B are side views of part of the optical module. According to this embodiment, as illustrated in FIG. 16, a cable boot 280 is attached to the optical cable 60 on which the tightening member 160 is attached, and cable clamp covers 271 and 272 are attached together to cover part of the cable boot 280.

The cable boot 280 has a tubular shape to allow insertion of the optical cable 60. The outside diameter of the cable boot 280 becomes greater toward its connector-side end, namely, the end of the cable boot 280 facing toward the optical connector 30, and is reduced toward the other end of the cable boot 280 facing away from the optical connector 30. Furthermore, the cable boot 280 includes a protrusion 281 formed at its connector-side end (that is, the right end of the cable boot 280 in the drawings). The cable clamp covers 271 and 272 of the same shape are provided with their respective depressions corresponding to the protrusion 281 of the cable boot 280. The cable boot 280 is fixed by the cable clamp covers 271 and 272 attached together from below and above the cable boot 280 with the protrusion 281 placed in the depressions of the cable clamp covers 271 and 272. The cable clamp cover 271 includes a snap-fit part 271a including hooks 271b. The cable clamp cover 272 includes a groove 272a corresponding to the snap-fit part 271a. The groove 272a is stepped to form an engagement part 272b corresponding to the hooks 271b.

According to this embodiment, as illustrated in FIG. 17A, the tightening member 160 attached on the optical cable 60 and the protrusion 281 of the cable boot 280 are placed inside the cable clamp cover 271. Thereafter, in this state, the cable clamp cover 272 is placed over the cable clamp cover 271 as illustrated in FIG. 17B. At this point, as illustrated in FIG. 17B, part of the snap-fit part 271a enters the groove 272a, and when the hooks 271b enter a region of the groove 272a wider than its entrance opening, the hooks 271b engage with the engagement part 272b. On the other side of the cable clamp covers 271 and 272, namely, on the side opposite to the side illustrated in FIGS. 17A and 17B, the cable clamp cover 272 includes a snap-fit part including hooks, and the cable clamp cover 271 includes a groove corresponding to the snap-fit part of the cable clamp cover 272 and an engagement part corresponding to the hooks of the cable clamp cover 272. The hooks of the cable clamp cover 272 engage with the engagement part of the cable clamp cover 271 the same as the hooks 271b engage with the engagement part 272b. As a result, the cable clamp covers 271 and 272 are connected (snap-fitted) to fix the optical cable 60 and the cable boot 280.

The cable clamp covers 271 and 272 are formed of the same material as the cable clamp covers 171 and 172 of the first embodiment. The cable boot 280 is formed of the same material as the cable boot 180 of the first embodiment.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. An optical module comprising:
an optical waveguide configured to propagate light;
an optical connector connected to the optical waveguide;
an optical cable connected to the optical connector;
a housing accommodating the optical waveguide and the optical connector;
a cable clamp cover connected to the housing and covering the optical cable;
a tightening member attached around a part of the optical cable covered by the cable clamp cover; and
a cable boot connected to the cable clamp cover,
wherein a material of the cable clamp cover is harder than a material of the cable boot, and
wherein a periphery of the tightening member includes a protrusion and a depression, and an inside surface of the cable clamp cover includes a protrusion and a depression, and
the tightening member is held by the cable clamp cover with the protrusion of the tightening member being in the depression of the cable clamp cover and the protrusion of the cable clamp cover being in the depression of the tightening member.

2. The optical module as claimed in claim 1, wherein
the cable clamp cover includes a first cable clamp cover and a second cable clamp cover that are attached together, and
a part of the cable clamp cover is covered with the cable boot.

3. The optical module as claimed in claim 1, wherein
the cable clamp cover includes a first cable clamp cover and a second cable clamp cover that are attached together, and
a part of the cable clamp cover is covered with the housing.

4. The optical module as claimed in claim 1, wherein
the cable clamp cover includes a first cable clamp cover and a second cable clamp cover that are attached together, and
a part of the cable boot and the part of the optical cable are covered with the cable clamp cover.

5. The optical module as claimed in claim 1, wherein
the cable clamp cover includes a first cable clamp cover and a second cable clamp cover that are attached together,
the first cable clamp cover includes a snap-fit part including a hook, and
the hook engages with an engagement part of the second cable clamp cover.

* * * * *